Figure 1:
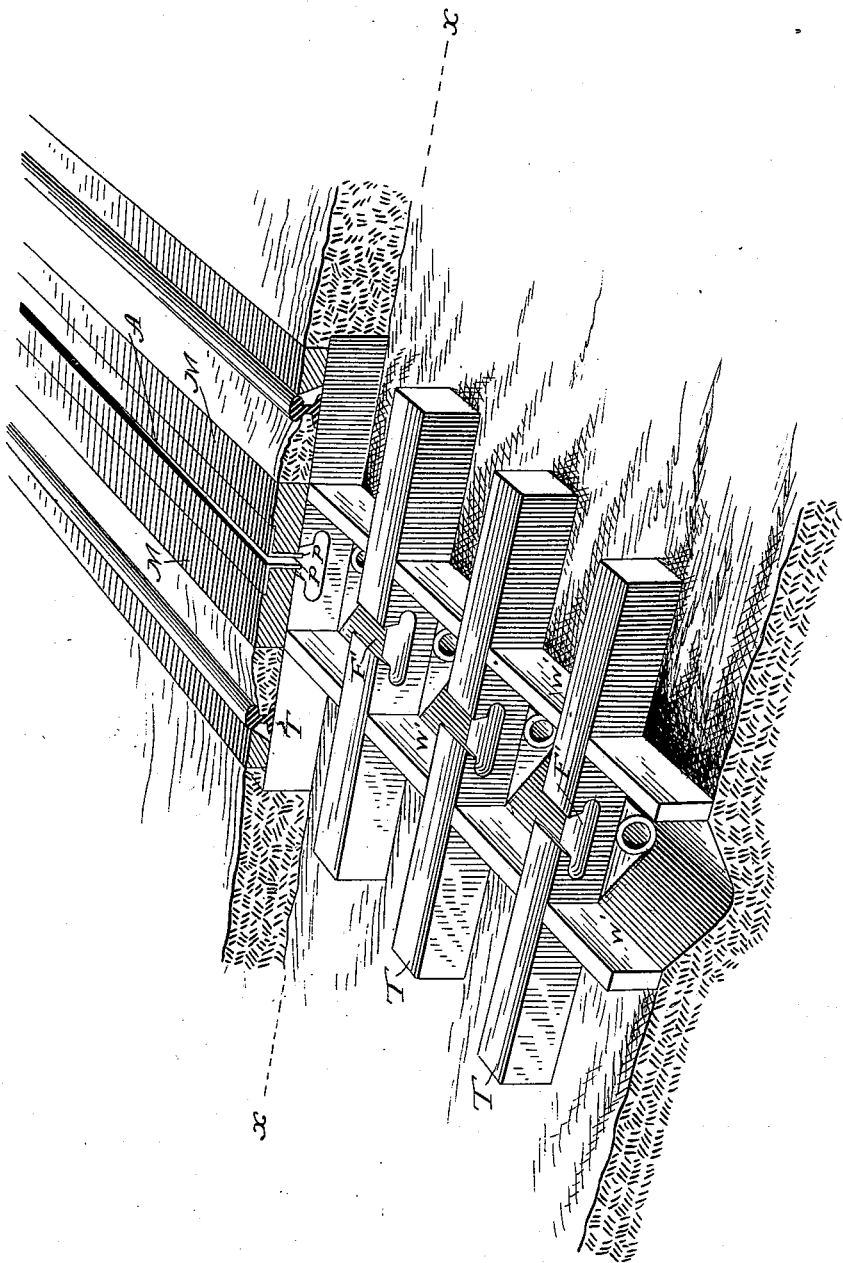

(No Model.)

3 Sheets—Sheet 1.

S. H. SHORT.
ELECTRICAL RAILWAY.

No. 343,076. Patented June 1, 1886.

Attest
Waller Donaldson
F. L. Middleton

Inventor
Sidney H. Short
by Joyce & Spear.
Attys.

(No Model.) 3 Sheets—Sheet 2.
S. H. SHORT.
ELECTRICAL RAILWAY.
No. 343,076. Patented June 1, 1886.
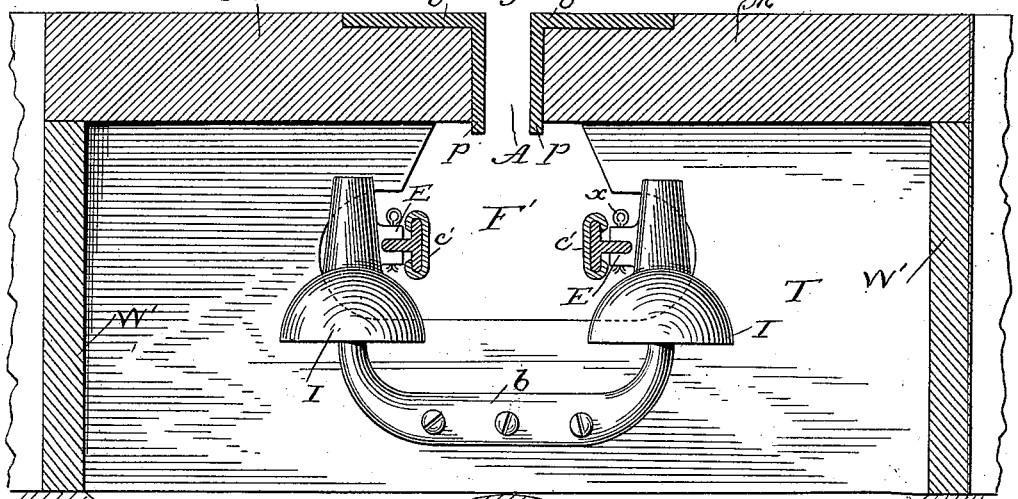
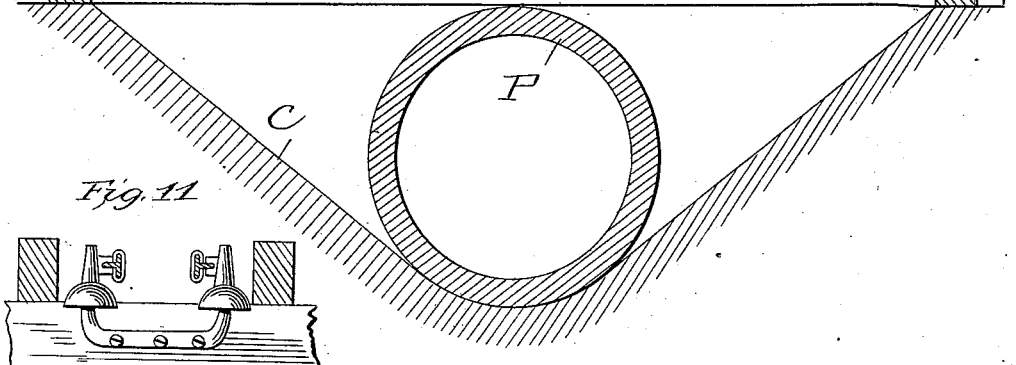
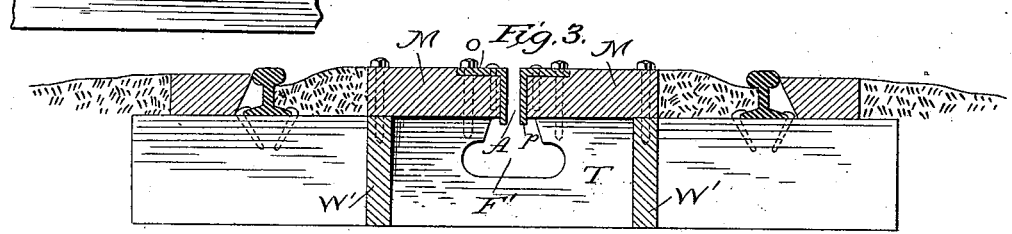
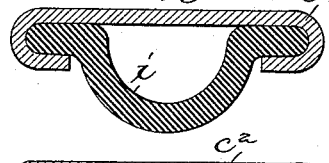
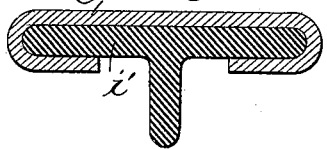
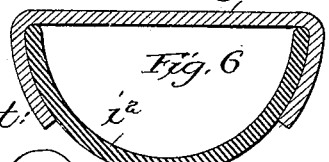
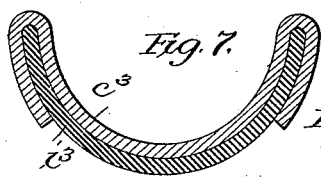
Attest:
Walter Donaldson
F. L. Middleton
Inventor
Sidney H. Short
by Joyce & Spear
Att'ys (No Model.) 3 Sheets—Sheet 3.
S. H. SHORT.
ELECTRICAL RAILWAY.
No. 343,076. Patented June 1, 1886.
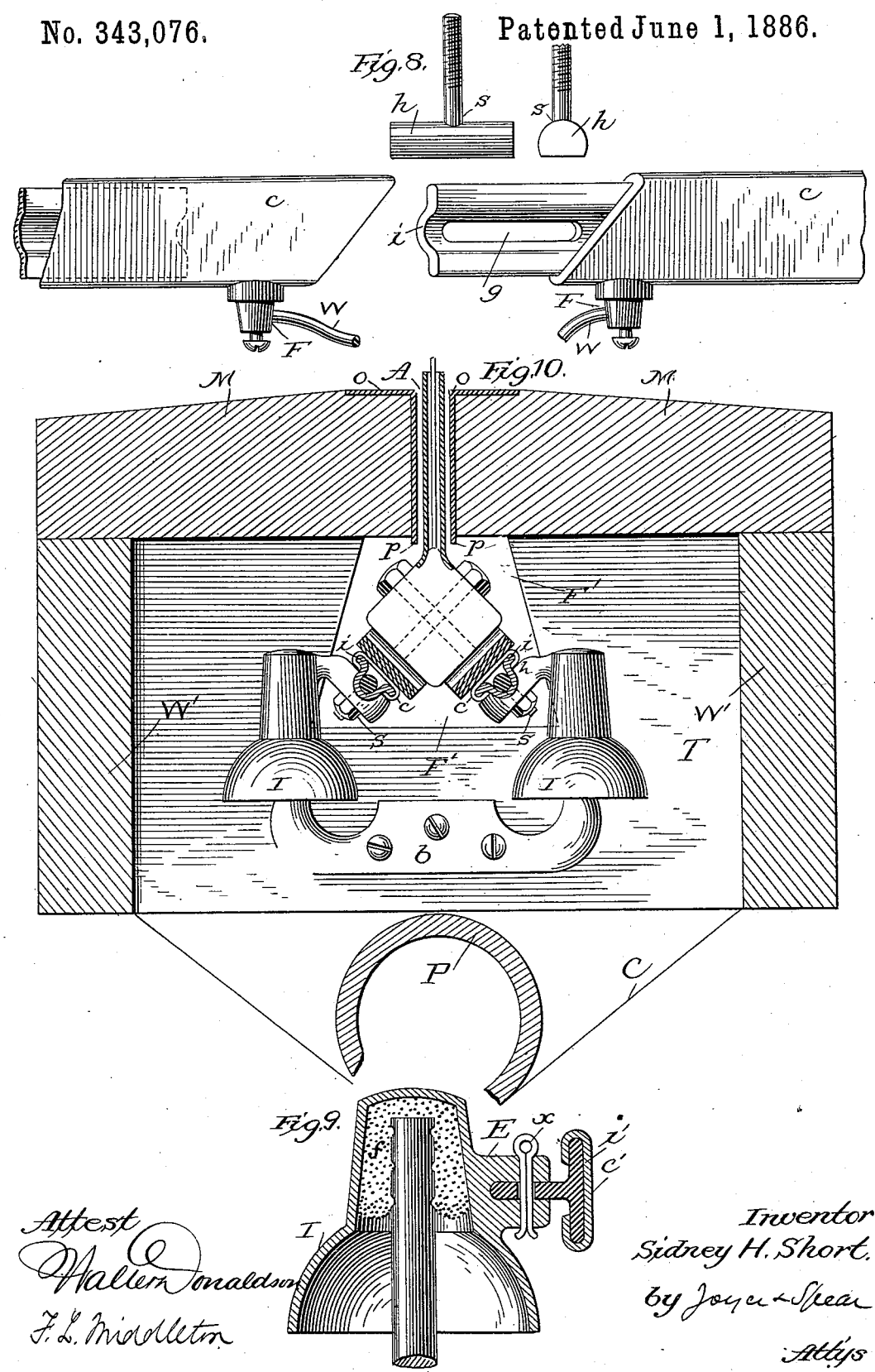
Attest
Walter Donaldson
F. L. Middleton
Inventor
Sidney H. Short.
by Joyce & Spear
Attys

UNITED STATES PATENT OFFICE.

SIDNEY H. SHORT, OF DENVER, COLORADO.

ELECTRICAL RAILWAY.

SPECIFICATION forming part of Letters Patent No. 343,076, dated June 1, 1886.

Application filed July 17, 1885. Serial No. 171,888. (No model.)

*To all whom it may concern:*

Be it known that I, SIDNEY H. SHORT, of Denver, in the county of Arapahoe and State of Colorado, have invented a new and useful Improvement in Electrical Railways; and I do hereby declare that the following is a full, clear, and exact description of the same.

My invention relates to electrical railways; and my object in this invention is to provide a cheap and efficient roadway for electrical locomotives and tram-cars, to supply it with inexpensive and durable conductors for the electric energy, and so to insulate the conductors that little leakage will occur even with currents of high tension. Further, I have sought so to protect the conductors and insulators from mud and water that they will be at all times in good working order.

It has also been one of the chief objects of this invention so to construct the electrical parts of the railway that they may be applied to existing roads with little cost or change in respect to the ordinary arrangement of ties and rails now in use.

In the accompanying drawings are shown the constructions which illustrate my invention.

In these drawings, Figure 1 represents a perspective view of the roadway, a portion being broken away to show the construction of the conduit. Fig. 2 shows the same in cross-section on line $x\ x$ of Fig. 1, with my insulators and conductors in place. Fig. 3 is a cross-section showing the tie in side elevation. Figs. 4, 5, 6, and 7 show in cross-section my improved conductor in different forms. Fig. 8 shows the conductor in perspective, illustrating the formation of the joints and connection with the insulators for this form of the conductor. Fig. 9 represents the insulator in cross-section with conductor attached. Fig. 10 shows the mode of attaching the channel-iron form of conductor-backing.

The four forms of conductors shown in Figs. 4, 5, 6, and 7 are of the same general construction, consisting of a backing of iron, $i\ i'\ i^2\ i^3$, which is to strengthen or serve as a support for a copper conductor, $c\ c'\ c^2$, whose edges are bent over the iron in such a way as to be held firmly. This avoids using a heavy bar of copper of larger sectional area than is necessary to carry the required current and simply for strength. On some accounts the T-iron shown in Fig. 5 is preferable; but I do not confine myself to any form. This form is convenient both for strength and for attachment to the insulator. All the forms present the face of the copper side $c$ to the brush.

The iron backing of the form shown in Figs. 4 and 8, as well as the web of the ⊓ form, is slotted where it is fastened to the insulating-support, as shown at $g$ in Fig. 8, in order to allow for expansion and contraction due to variations of temperature. A bolt is used to fasten the conductor to the insulator, as shown at $s$, the head fitting into the hollow of the iron backing of the conductor, as shown at $h$, Fig. 10. When the T-iron is used, it is fastened, as shown in Figs. 2 and 9, with a split pin passing through a slotted hole in the web of the T.

The form shown in Fig. 7 is varied from that shown in Figs. 4 and 8 by rolling or otherwise placing the copper to conform to the channel of the iron backing without change in the overlapping edges. This gives a channeled form of the surface of the conductor adapted to a form of curved brush which I design to use. These conductors are light, but will not bend easily, because of their form. The copper covering $c$ should extend over one end and not entirely at the other end of the iron bars, so that the sections may be slipped into each other, as shown in Fig. 8, and the joints made good conductors by connecting the coppers of the two bars with a copper cable, W, soldered or otherwise fastened, as at F. The iron backing and copper face of these conductors both act to transmit the electric energy. The copper is put onto the wrought-iron bars by cutting the copper into strips and rolling the edges over, as shown, or by electroplating the copper onto the iron. The form of the head $h$ of the bolt $s$ may be modified to adapt it to the forms of conductors shown in Figs. 6 and 7. That shown in Fig. 8 is adapted to the iron backing of Fig. 4.

In forming the conduit for the conductors the ordinary ties, T, are boxed or cut out, as shown at F', Figs. 2 and 3, and are then put into the ground in the ordinary manner, or the boxing or notching may be done after the ties are in the ground and the rails spiked to them. The rails are fastened to the ties in the ordinary manner. Stringers may, however, be used under the rails, if desired. The notch is made narrow at the top of the tie to support the timbers M M, placed over the conductors, and it may be broadened below, if necessary, as shown in the figures. The timbers M M are separated, leaving a narrow slot, as shown at A, forming part of the way, through which an arm extends and travels, carrying the collecting-brushes, which take the current from the conductors $c\ i$. The edges of these timbers, which are spiked or bolted onto the ties, are protected by ordinary angle-iron, as shown in section at $o\ o$. These angle-irons run continuously along the inner ends of the timbers M, and their edges are made to dip below the lower surface of the timbers M M, as shown at $p\ p$, to allow water to drip off and fall between the conductors. They form a continuous way for the brush-shank. Short pieces of timber are cut to fit between the ties, as shown at W' W', forming a continuous guard on each side to prevent the dirt from rolling into the spaces left between them. These timbers stand on edge, and extend from the outer edge of the timbers M M to the lower surface of the tie. Under the center of each tie is placed a short drain-tile, equal in length to the width of the tie, as shown at P, Fig. 2, connecting one cavity between the ties with the next. A concrete or stone bottom, C, may be put in each space between the ties to collect the water and mud which fall through the slot A, and which from thence may be drained to one side of the track at the lowest point or into a sewer. Outside of this box-like conduit the earth is packed about the ties in the ordinary manner, or any form of ballast may be used. The covering-timbers M M, I prefer to bolt down with lag-screws, so that they may be easily removed for the purpose of repairing the conductors and insulators or to clean out the conduit.

As shown in Fig. 2, a bracket, $b$, is fastened to the side of the tie, carrying two insulators, which support the conductors $c\ i\ c\ i$. The insulators are put in such a position that the conductors and insulators will not touch the wooden sides of the conduit or cut ends of the ties. The brackets are so made as to bring the insulators well out into the space between the ties, so that the bell I will not touch the side of the tie.

The tie need not be notched when it is not necessary to protect the conductors or insulators; but the insulator-brackets may be raised so that the conductors may pass over the ties, and simply timbers may be spiked to the ties on either side. Such a construction can be used on elevated roads or across the country.

The faces of the conductors in Fig. 2 are shown in vertical planes; but in some cases it will be necessary or desirable to arrange them in inclined planes. This economizes space, and has other advantages. Fig. 10 also shows the mode of attaching the channel-iron form of conductor-backing.

Any kind of an insulating device may be used between the conductor and supporting-bracket $b$; but I prefer to use one as shown in section, Fig. 9, and in elevation, Fig. 2. It consists of a cast-metal shell, I, with a stud, E, adapted to receive the flange of the angle-iron, as shown in Fig. 2, or the back of the channel-iron, as shown in Fig. 10. In the first form the split pin $x$ passes through the stud or web of the angle-iron, and in the second the bolt $s$ passes through the lug and is held by a nut, as shown in Fig. 10. The lower portion of the shell of the insulator is expanded into a large umbrella, to shed water and keep dry this insulating material $f$, between it and the bracket $b$.

The insulating material is preferably sulphur melted and poured into the space shown, the outside of the bracket and the inside of the shell being roughened to make the sulphur adhere.

I may use rubber, glass, wood, or other insulating material, and do not confine myself to any one of them.

Fig. 11 is a view of a modification, and shows how the conductor and its supporting-bracket are attached to the ties of elevated railways or in positions where it is not necessary to afford protection for the conductor.

I claim—

1. In an electrical railway, the notched ties, the side pieces, W', arranged to form a guard on each side, and the timbers M M, secured to the ties, the parts being constructed and combined substantially as described.

2. In an electrical railway, continuous ties connecting the rails, notched to receive the conductors and combined with supporting-brackets for the conductors, and a continuous way for the shank of the brushes, all substantially as described.

3. In combination with the notched ties and the timbers upon them, the angle-irons having lower edges projecting below the timbers, substantially as described.

4. In combination, the brackets $p$, fixed to the sides of the ties in the described relation to the notches, insulators on said brackets, and the conductors connected thereto and located in the notches, all substantially as described.

5. In an electrical railway, the brackets located on the sides of the ties and the conductors supported thereon in notches in the ties, in combination with the tube under each tie, connecting the spaces on each side of the tie, substantially as described.

6. In combination, the ties, conductors, and the supporting devices for the conductors fixed to the sides of the ties, the tiles, and the timbers W', all substantially as described.

7. The iron backing of the conductor, fastened to the insulators, and a copper facing made in sections with edges turned over the edges of the backing and breaking joints with the backing, said sections being connected by flexible conductors, substantially as described.

In testimony whereof I have signed my name to this specification in the presence of two subscribing witnesses.

SIDNEY H. SHORT.

Witnesses:
C. H. McLAUGHLIN,
HORACE A. GRAY.